United States Patent Office 3,370,928

Patented Feb. 27, 1968

3,370,928

TUNGSTEN CARBIDE BASE CERMET

Michael Fassler, Middletown, Conn., and Mervyn H. Horner, Del Mar, Calif., assignors to United Aircraft Corporation, East Hartford, Conn., a corporation of Delaware No Drawing. Filed Nov. 13, 1964, Ser. No. 411,155
5 Claims. (Cl. 29—182.7)

This invention relates in general to dense, very hard cermets and more particularly to tungsten carbide base cermets which are characterized by excellent chemical and metallurgical compatibility with liquid metals at elevated temperatures.

Although not confined thereto, the tungsten carbide cermets of this invention have found particular utility in bearings, seals, valve bodies, and hardfaced wear-resistant coatings in apparatus exposed to and operational in a high-temperature liquid metal environment.

The advantages of a bearing material capable of long term operation submerged in and lubricated by liquid metals at nuclear reactor design temperatures are quite obvious. In space systems particularly, the design criteria dictate the use of nuclear reactor power sources utilizing efficient liquid metal heat transfer media. Since the durability of the entire power generation system is limited by the endurance of the weakest component within the system, particular attention has been directed toward the development of bearing materials and bearing designs which will maintain satisfactory performance over extended periods of time in a liquid metal environment.

It is well known that liquid metals are particularly corrosive in nature, but their outstanding characteristics as heat transfer fluids have dictated their use in space powerplants to meet the stringent requirements imposed thereon. Substantial programs have been undertaken to develop high temperature liquid metal containment materials that are compatible therewith. However, while the liquid metal containment studies and those connected with bearing development have many problems and characteristics in common, they nevertheless entail many differences in approach. Many materials that are otherwise compatible with liquid metals cannot be adapted to function satisfactorily as bearings or seals. For example, it has been rather a common occurrence in test apparatus, utilizing supposedly compatible materials, to find valve disc diffusion bonded to their mating seats following exposure to liquid metals at high temperature. Under the static loading imposed on the abutting surfaces by the valve closure mechanism, a diffusion bond was effected which rendered the valve completely inoperative. Similarly, in dynamic testing, severe galling has occurred on contacting parts which was not anticipated in view of the known material properties and initial compatibility studies. Additionally, bearing materials may exhibit near perfect performance for extended periods of time only to fail completely and suddenly short of the desired endurance term. For example, a 92 weight percent tungsten carbide, 6 weight percent cobalt, 2 weight percent tantalum-columbium-carbide cermet displayed undesirable leaching characteristics after 7000 hours of testing which was not apparent after 2000 hours.

A novel and useful cermet consisting of essentially tungsten carbide, molybdenum and columbium carbide, hereafter referred to as WC-Mo-CbC, was discovered to possess all of the necessary characteristics and qualities required of a bearing material intended for long term operation in a corrosive liquid metal environment. From the extensive testing performed it has been established that this cermet composition has a wear life of at least 10,000 hours and, in the temperature range of 1000–1800° F., will retain its high hardness, strength, good bearing properties and excellent corrosion resistance to normally highly corrosive media.

It is, therefore, an object of this invention to provide a hard, high-temperature, corrosion-resistant cermet composition.

A further object of this invention is to provide a cermet composition which may be fabricated into a variety of useful shapes and which may be suitably finished to provide a polished bearing surface, and which will maintain a surface luster at elevated temperature in liquid metal.

An additional object is to provide a convenient method by which a hard, tungsten-carbide base cermet may be economically fabricated into a variety of shapes and sizes suitable for incorporation into operational hardware.

A still further object is the provision of a bearing and seal material which is wear-resistant at elevated temperatures.

Another object of this invention is the provision of a tungsten carbide base bearing material which is chemically and metallurgically compatible with liquid metals at temperatures at which nuclear reactors are operational.

An additional feature is to provide a tungsten carbide base bearing material which may be run submerged in and lubricated by high temperature liquid metals.

These and other objects, advantages and uses of this invention will be apparent or will be specifically pointed out in the following description and appended claims and should not be construed as limiting the scope of this invention.

The cermet development program was initially oriented to provide a bearing material which could be run submerged in and lubricated by molten lithium. The basic criterion adopted, therefore, was complete liquid metal compatibility at high temperature. In the initial screening of materials, many novel combinations were tested in addition to a wide variety of commercially available alloys and cermets. The more promising materials were subjected to long term exposure to molten liquid metals, including lithium and sodium-potassium alloy, hereafter referred to as NaK, in a tilting furnace for up to 7000 hours. Further, it was evident that a satisfactory bearing material would necessarily exhibit the following additional characteristics: fabricability to permit the production of a variety of shapes, reasonable strength at temperature for structural stability, high hardness for durability, a resistance to diffusion bonding, and a polishing capability for the attainment of good bearing surfaces. Additional test apparatus and techniques were developed and utilized to investigate each of the initially screened materials with respect to its suitability as a bearing material in the light of the above-mentioned requisite characteristics.

It was established that a novel cermet of the basic composition, WC-Mo-CbC, appeared to possess all of the qualities desired in a bearing material destined for high temperature liquid metal service and extensive testing of this cermet composition was undertaken.

In referring to material compositions throughout this application it will be understood that the percent referred to in the various cermet compositions is a percent by weight. Further, for the sake of clarity, reference to the various compositions will be made in standard metallurgical shorthand, the numbers preceding the various components in the total composition referring to a weight percentage. For example, the most preferred cermet composition of this invention consists of essentially 90 percent by weight of tungsten carbide, 8 percent by weight of molybdenum and 2 percent by weight of columbium carbide, and is referred to as 90 WC-8Mo-2CbC.

A cermet of the composition 90 WC-8Mo-2CbC was formulated and fabricated into a variety of shapes for use in the advanced test program. It was prepared by powder metallurgical techniques and exhibited a density after sintering of 97.5–100 percent of the theoretical density, and could be lapped to a surface finish of better than 2 microinches. It possessed a hardness of approximately 1850 DPH and had a favorable mean coefficient of thermal expansion between 400° F. and 1800° F. of from 2.2 to 2.6 inches/inch/° F.

Several tests were performed with the tungsten carbide in the 59–80 percent by weight range and, although there was a significant decrease in the ease of compact fabricability, bearing performance in this range appeared to be satisfactory. However, since the hardness of the cermet, and consequently its wearing capability, is generally dependent upon the percentage of tungsten carbide in the total composition, most of the development effort was directed toward cermet compositions wherein the weight of tungsten carbide ranged between 80 and 90 percent. The cermet compositions in this range were satisfactory as a bearing material in all respects. It was similarly found that when the amount of tungsten carbide in the total composition exceeded 90 percent, a significant decrease in compact strength occurred. It had previously been established that the Mo-CbC ratio within the cermet was satisfactory over a range of from 50 to 90 percent by weight of molybdenum, with a preferred ratio of molybdenum to columbium carbide in a bearing application ranging from 70 to 90 percent.

The metallurgical characterization of the cermet appears dependent upon its fabrication history. A metallurgical examination conducted after hot pressing has indicated that the various components are bound together in a two-phase structure, although re-examination following heat treatment revealed only a single phase solid solution. Testing has established that the cermet performance is satisfactory with or without the after-sintering heat treatment. While the exact function of each of the individual components within the cermet is not known, it is believed that the molybdenum functions primarily as a binder, facilitating fabrication of the cermet by hot-pressing techniques and enhancing the ductility of the finished product. The columbium carbide is thought to contribute to the cermet both as a binder and as a hardening agent. In the hot pressing operation there is a liquid phase formed which produces the requisite bonding. This phase is believed to be a binary mixture of molybdenum and columbium carbide which forms a eutectic with a melting point of approximately 3750° F. Although the individual components comprising the total cermet composition all exhibit a melting point in excess of 4700° F., complete densification of the cermet of this invention may be effected at the eutetic melting temperature.

The 90 WC-8Mo-2CbC cermet, constituting the most preferred composition for a liquid metal bearing application, is prepared in the following manner:

Fine powders of −325 mesh WC, −270 mesh Mo and −325 mesh CbC are blended in the correct proportions 90 WC-8Mo-2CbC. The resulting mixture of powders is ball-milled with 2 weight percent of phenol-formaldehyde resin binder in a steel ball mill with steel balls for 20 hours. A green compact is formed from the mixture by setting the resin binder in a warm-pressing operation between steel dies at 250° F. and 4 t.s.i. The resulting green compact has a density of approximately 55 percent of theoretical density and can be handled easily. Since the only function of the phenol-formaldehyde binder is to permit the formation of the intermediate green compact, it is obvious that other binders may be utilized to perform the same function. The green compact is then rough machined to the appropriate shape and size, taking into account the anticipated shrinkage inherent when the green compact is subsequently sintered to its final density. It is important to note that, while the green compact is readily subjected to machining with carbide tooling, the sintered compact is so hard that any change in its dimensions must be effected by grinding. For this reason, all rough machining is preferably performed prior to sintering. The machined green compact is then hot pressed between steel dies in an induction furnace under vacuum or inert gas cover at 3750–4000° F. and 7–10 t.s.i. until densification is complete. Typically, in the fabrication of this cermet composition the compact is raised to the sintering temperature as fast as the physical limitations of the equipment will permit, and complete densification is normally effected within 15 minutes. Following the sintering operation, the compact is finish-ground on a diamond wheel to its final dimensions and the bearing surfaces are lapped with ½ micron diamond dust in cashmere cloth to produce a surface finish of better than 2 microinches.

By appropriate adjustment of the weight proportion of powders in the initial mixture, other compacts of varying composition are similarly prepared.

Articles thus prepared were subjected to extensive testing. Compacts exposed to molten lithium at 1100° F. for 7000 hours in a tilting furnace with a 400° F. temperature differential exhibited negligible weight loss with no apparent corrosive attack evident on metallographic examination. Other compacts were exposed for varying lengths of time to lithium and to NaK at temperatures up to 1800° F. In all cases the cermet composition of this invention exhibited excellent compatibility with the liquid metals.

Additional compacts were tested for wear resistance in apparatus in which a round surface was caused to bear against a rotating flat disc in line contact while submerged in lithium and in NaK at 1100° F. The disc was rotated at a circumferential contact speed of 270 feet/minute under a 20-pound load, the contact pressure between the parts being approximately 2500 p.s.i. Parts composed of the subject cermet composition tested in this apparatus exhibited negligible wear and weight loss upon test completion and revealed no galling or seizing between the opposing cermet parts. In these tests cermet parts were run against each other and against a wide variety of other materials including plasma-sprayed WC-Co on Hastelloy X. Test temperatures were varied between 600° F. and 1800° F.

Although the development program was primarily directed toward a lithium lubricated bearing material, articles fabricated from this cermet composition were tested in air and in helium at temperatures to 1000° F. In one such test a buffer bearing was run under at 37.5 pound load for 100 hours in air at ambient temperature, followed by 500 hours in helium at 1000° F. with no apparent wear resulting. In another test a journal bearing was run under a 37.5 pound load for 500 hours in air at ambient temperature with no galling, seizing or apparent wear.

As a result of the successful development program, bearings fabricated from the cermet composition of this invention have been designed for incorporation in valves and pumps of advanced design.

While we have described certain preferred compositions of our cermet and methods of making the same, the invention in its broader aspects is not limited thereto. It will be understood that the cermet composition of this invention may be otherwise made and utilized within the scope of the accompanying claims without sacrificing its advantages.

We claim:

1. A hard, corrosion-resistant cermet composition consisting of essentially 50–90 weight percent of tungsten carbide with the balance consisting of essentially molybdenum and columbium carbide, the ratio of molybdenum to columbium carbide being 50–90 percent by weight.

2. A hard, corrosion-resistant cermet composition consisting of essentially 80–90 weight percent of tungsten carbide with the balance consisting of essentially molybdenum and columbium carbide, the ratio of molybdenum to columbium carbide being 50–90 percent by weight.

3. A hard, corrosion-resistant cermet composition consisting of essentially 80–90 weight percent of tungsten carbide with the balance consisting of essentially molybdenum and columbium carbide, the ratio of molybdenum to columbium carbide being 70–90 percent by weight.

4. A hard, lithium-compatible cermet composition consisting of essentially 80–90 weight percent of tungsten carbide, 5–15 weight percent of molybdenum and 1–5 weight percent columbium carbide.

5. A liquid metal-compatible bearing material consisting of essentially 90 weight percent of tungsten carbide, 8 weight percent molybdenum and 2 weight percent columbium carbide.

References Cited

UNITED STATES PATENTS

| | | | |
|---|---|---|---|
| 2,198,343 | 4/1940 | Kieffer | 29—182.7 |
| 2,253,969 | 8/1941 | Dawihl | 29—182.7 X |
| 2,711,009 | 6/1955 | Redmond | 29—182.7 |
| 2,731,710 | 1/1956 | Lucas | 29—182.7 |
| 3,147,542 | 9/1964 | Boeckeler | 29—182.7 |

FOREIGN PATENTS

| | | |
|---|---|---|
| 705,844 | 3/1954 | Great Britain. |

REUBEN EPSTEIN, *Primary Examiner.*

BENJAMIN R. PADGETT, L. DEWAYNE RUTLEDGE, *Examiners.*

A. J. STEINER, *Assistant Examiner.*